(12) United States Patent
Lee

(10) Patent No.: US 10,598,092 B2
(45) Date of Patent: Mar. 24, 2020

(54) TURBOCHARGER FOR VEHICLE

(71) Applicants: Hyundai Motor Company, Seoul (KR); Kia Motors Corporation, Seoul (KR)

(72) Inventor: Woo Jin Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 108 days.

(21) Appl. No.: 15/978,498

(22) Filed: May 14, 2018

(65) Prior Publication Data

US 2019/0178163 A1 Jun. 13, 2019

(30) Foreign Application Priority Data

Dec. 13, 2017 (KR) .......................... 10-2017-0171053

(51) Int. Cl.
F02C 7/06 (2006.01)
F02C 6/12 (2006.01)
F01M 11/02 (2006.01)
F02C 7/12 (2006.01)
F01D 5/18 (2006.01)
F02C 7/18 (2006.01)
(Continued)

(52) U.S. Cl.
CPC .............. F02C 7/06 (2013.01); F01D 5/085 (2013.01); F01D 5/187 (2013.01); F01M 11/02 (2013.01); F02C 6/12 (2013.01); F02C 7/12 (2013.01); F02C 7/18 (2013.01); F01M 2011/021 (2013.01); F02B 39/14 (2013.01); F05D 2220/40 (2013.01); F05D 2240/61 (2013.01); F05D 2260/20 (2013.01)

(58) Field of Classification Search
CPC ......... F01D 5/085; F01D 5/187; F01M 11/02; F01M 2011/021; F02C 6/12; F02C 7/06; F02C 7/12; F02C 7/18; F02B 39/14; F05D 2220/40; F05D 2240/61; F05D 2260/20
See application file for complete search history.

(56) References Cited

U.S. PATENT DOCUMENTS 4,251,186 A 2/1981 Chomel et al.
8,850,878 B2 * 10/2014 Flynn ................... F02D 41/221
73/114.77

FOREIGN PATENT DOCUMENTS

JP 2002-517668 A 6/2002
JP 3889050 B2 12/2006
KR 20090064202 A 6/2009

* cited by examiner

Primary Examiner — Brandon D Lee
(74) Attorney, Agent, or Firm — Mintz Levin Cohn Ferris Glovsky and Popeo, P.C.; Peter F. Corless

(57) ABSTRACT

An turbocharger for a vehicle is provided. The turbocharger includes a shaft that has a hollow aperture at an inside thereof and an outer circumferential surface of the shaft includes an inlet aperture and an outlet aperture which communicate with the hollow aperture. A turbine wheel is integrally installed at the shaft and a hollow groove formed in the wheel communicates with the hollow aperture. A center housing includes a shaft groove in which the shaft is rotatably installed. The center housing includes an oil passage to which oil is supplied from an oil pipe, an air passage to which air is supplied from an air tank, and an injection passage extending to the shaft groove while being connected to the oil and air passages. An oil valve and an air valve are installed in the oil and air passages, respectively, to selectively open/close flow of a fluid.

9 Claims, 7 Drawing Sheets

(51) Int. Cl.
*F01D 5/08* (2006.01)
*F02B 39/14* (2006.01)

<CROSS SECTION TAKEN ALONG A-A>

<CROSS SECTION TAKEN ALONG B-B>

TURBOCHARGER FOR VEHICLE

CROSS REFERENCE TO RELATED APPLICATION

The present application claims priority to Korean Patent Application No. 10-2017-0171053, filed on Dec. 13, 2017, the entire contents of which is incorporated herein for all purposes by this reference.

BACKGROUND

1. Technical Field

The present invention relates to a turbocharger, and more particularly, to a turbocharger for a vehicle that minimizes a turbine wheel inertia by reducing a weight of a turbine wheel and reduces manufacturing costs by cooling the turbine wheel.

2. Description of the Related Art

A turbocharger is used to improve an output of an engine. A turbine wheel is integrally mounted rotatably on a first side of a turbine shaft, and at the same time a compressor wheel is integrally mounted rotatably on a second side of the turbine shaft. Exhaust gas discharged from the engine is introduced into a turbine case that surrounds the turbine wheel to rotate the turbine at a high speed, and air is suctioned through a compressor case that surrounds the compressor wheel while the turbo shaft and the compressor wheel rotate together by a rotation of the turbine wheel. The suctioned air is pressurized and accelerated, but the speed of the suctioned air is reduced while the suctioned air passing through the diffuser, and thus, the pressurized air is transmitted from an outlet of the compressor case to an intake manifold while the speed energy is changed to a pressure.

Generally, since the high-temperature exhaust gas flows on the turbine wheel side, the turbine wheel is made of expensive Inconel material to withstand the high temperature exhaust gas. The Inconel alloy is expensive and also substantially heavy, thus increasing the overall weight of the turbocharger due to the turbine wheel and a low speed torque is decreased.

The matters described as the related art have been provided merely for assisting in the understanding for the background of the present invention and should not be considered as corresponding to the related art known to those skilled in the art.

SUMMARY

An object of the present invention is to provide a turbocharger for a vehicle capable of reducing a weight of a turbine wheel and cooling the turbine wheel by machining the turbine wheel to form a hollow portion in the turbine wheel and circulating oil thereinto.

According to an exemplary embodiment of the present invention, a turbocharger for a vehicle may include: a shaft having an inside provided with a hollow aperture and having an outer circumferential surface provided with an inlet aperture and an outlet aperture which communicate with the hollow aperture; a turbine wheel integrally installed at a first end of the shaft and a hollow groove formed in the turbine wheel communicates with the hollow aperture of the shaft; a center housing having an inside provided with a shaft groove in which the shaft is rotatably installed and provided with an oil passage to which oil may be supplied from an oil pipe, an air passage to which air is supplied from an air tank, and an injection passage that extends to the shaft groove while being connected to the oil passage and the air passage; and an oil valve and an air valve installed in the oil passage and the air passage, respectively, to selectively open and close a flow of a fluid.

The inlet aperture may be formed at a point facing a direction in which the injection passage extends. The inlet aperture may be inclined to approach the turbine wheel toward a radial inside of the shaft. The injection passage may extend to be inclined at the same angle as the inlet aperture. Additionally, the inlet aperture may be inclined to position an inlet formed on an outer circumferential surface of the shaft at a point spaced by a set distance in a circumferential direction from an outlet formed on an inner circumferential surface of the shaft. The outlet aperture may extend along a radial direction of the shaft.

An inside of the center housing may include a drain passage to discharge oil in the shaft groove at a point facing the outlet aperture to an outside. The turbocharger may further include: a plurality of bearings installed between the shaft and the shaft groove to allow the shaft to rotate relatively with respect to the shaft groove. The plurality of bearings may be installed at positions spaced apart from each other to be disposed between the inlet aperture and the outlet aperture.

The turbocharger may further include: a controller configured to operate both the oil valve and the air valve to be closed when the vehicle speed is less than the set vehicle speed and the exhaust gas temperature is less than the set temperature, the oil valve to be opened and the air valve to be closed when the vehicle speed is equal to or greater than the set vehicle speed and the temperature of the exhaust gas is equal to or greater than the set temperature, and the oil valve to be closed and the air valve to be opened when the vehicle speed is less than the set vehicle speed and the temperature of the exhaust gas is equal to or greater than the set temperature.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a turbocharger for a vehicle according to exemplary embodiments of the present invention will be described with reference to the accompanying drawings.

Figure 1:
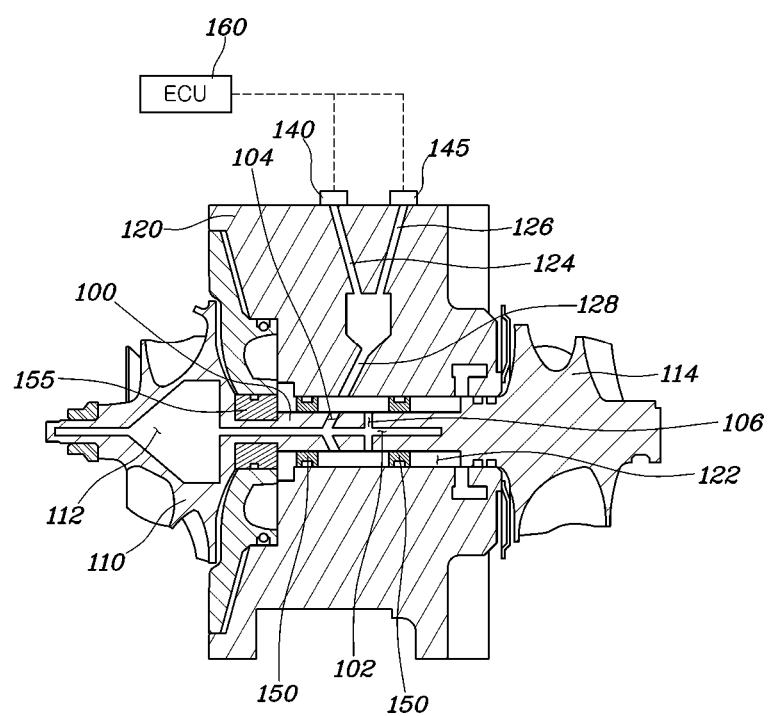
FIG. 1 is a cross-sectional view illustrating a turbocharger for a vehicle according to an exemplary embodiment of the present invention.
Figure 2:
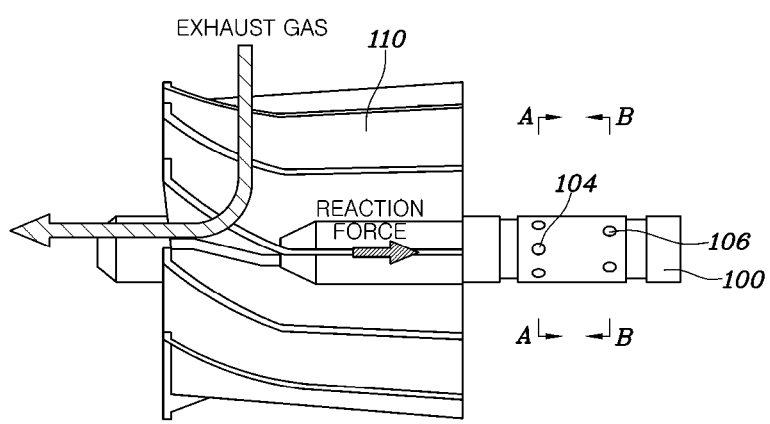
FIG. 2 is a diagram illustrating a shaft and a turbine wheel according to an exemplary embodiment of the present invention.

FIG. 1 is a cross-sectional view illustrating a turbocharger for a vehicle according to an exemplary embodiment of the present invention, and FIG. 2 is a diagram illustrating a shaft and a turbine wheel according to an exemplary embodiment of the present invention. Referring to FIGS. 1 and 2, the turbocharger for a vehicle according to the present invention may include: a shaft 100 with a hollow aperture 102 formed therein and an inlet aperture 104 and an outlet aperture 106 formed at an outer circumferential surface of the shaft 100. The inlet aperture 104 and the outlet aperture 106 communicate with the hollow aperture 102. Additionally the turbocharger may include a turbine wheel 110 integrally installed at a first end of the shaft 100 and having a hollow groove 112 formed in the turbine wheel 110 which communicates with the hollow aperture 102 of the shaft 100; a center housing 120 having a shaft groove 122 formed therein, wherein the shaft 100 is rotatably installed in the shaft groove 122. Additionally, the center housing may include an oil passage 124 to which oil is supplied from an oil pipe, an air passage 126 to which air is supplied from an air tank, and an injection passage 128 that extends to the shaft groove while being connected to the oil passage 124 and the air passage 126. The turbocharger may further include an oil valve 140 and an air valve 145 installed in the oil passage 124 and the air passage 126, respectively, to selectively open and close a flow of a fluid.

Particularly, the turbine wheel 110 and the compressor wheel 114 may each be integrally connected to both side ends of the shaft 100, and thus, when the turbine wheel 110 rotates by the flow of the exhaust gas, the shaft 100 and the compressor wheel 114 pressurizes engine intake air while rotating together. The inside of the center housing 120 may include the shaft groove 122 which is a space in which the shaft 100 is rotatably installed, and may include an oil passage 124, an air passage 126, and an injection passage 128 to supply oil or air toward the shaft groove 122.

The oil passage 124 may be connected to an oil pipe (not illustrated) to supply oil to lubricate the inside of the center housing 120 and may be supplied with oil and may discharge the oil into the shaft groove 122. The air passage 126 may be connected to an air tank (not illustrated) and may be supplied with air and may supply the air into the shaft groove 122. However, a supply source of the oil and air may be changed based on the model of vehicles. For example, in vehicles such as commercial vehicles, oil and air may each be supplied from components such as an oil tank and a compressed air tank.

According to the present invention, the shaft 100 may be formed integrally with the turbine wheel 110, in which the hollow aperture 102 and the hollow groove 112 are disposed to communicate with each other and the hollow aperture 102 of the shaft 100 may include the inlet aperture 104 and the outlet aperture 106 which communicate with the shaft groove 122 to introduce the oil or air into the hollow groove 112 of the turbine wheel 110 through the hollow aperture 102, thereby cooling the turbine wheel 110. The turbine wheel 110 may be configured to rotate based on the flow of the exhaust gas. Since the turbine wheel 110 is in contact with the high-temperature exhaust gas (e.g., about 700° C. to 900° C.), the existing turbine wheel 110 may be manufactured using materials having excellent mechanical properties to withstand the high temperature.

For example, the turbine wheel 110 may be made of an Inconel material, which may be more expensive and heavier than other materials. However, since the oil is supplied to the hollow groove 112 formed in the turbine wheel 110 to perform the cooling as in the present invention, the turbine wheel 110 may be manufactured using relatively inexpensive materials and therefore the cost of the turbine wheel may be decreased. In addition, since the hollow groove 112 is formed in the turbine wheel 110, the turbine wheel 110 is lightweight to reduce the inertia of the turbine wheel 110, thereby improving startability and low speed torque performance of the vehicle.

Moreover, according to the present invention, the inlet aperture 104 may be formed at a point facing a direction in which the injection passage 128 extends. Generally, since the center housing 120 maintains a fixed state, the injection passage 128 injects the oil or air toward the shaft 100 at the fixed position, and since the shaft 100 rotates together with the turbine wheel 110, whether the oil or air may be smoothly supplied into the hollow aperture 102 of the rotating shaft 100 influences the cooling performance of the turbine wheel 110. Therefore, for the oil or air injected from the injection passage 128 to smoothly flow into the inlet aperture 104 of the shaft 100, the inlet aperture 104 may be formed at a point that corresponds to a direction in which the injection passage 128 extends.

Particularly, a plurality of inlet apertures 104 may be formed along the circumference of the shaft 100 to allow the oil or air to flow more smoothly into the rotating shaft 100. The oil or air discharged from the injection passage 128 may not be fully introduced into the inlet aperture 104 of the rotating shaft 100. However, most fluids may be introduced into the inlet aperture 104 due to the pressure at which the fluid is discharged from the injection passage 128, and the fluids that are not introduced into the inlet aperture 104 may be used for the lubrication of the shaft 100 within the shaft groove 122. In addition, the inlet aperture 104 may be inclined to approach the turbine wheel 110 toward the radial inside of the shaft 100.

Figure 3:
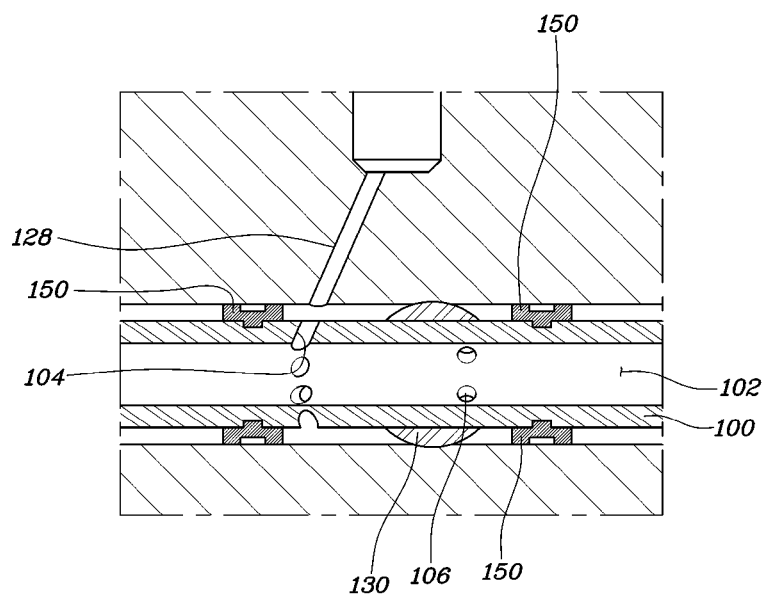
FIG. 3 is a cross-sectional view illustrating an inside of a center housing according to an exemplary embodiment of the present invention.

FIG. 3 is a cross-sectional view illustrating an inside of a center housing according to an exemplary embodiment of the present invention. As an arrow shown illustrated in FIG. 2, the exhaust gas flows to be introduced in the radial direction of the turbine wheel 110 and then discharged in an axial direction thereof. According to the law of action and reaction, the shaft 100 is applied with a reaction force in the axial direction opposite to the direction in which the exhaust gas is discharged. Referring to FIG. 1, the shaft 100 may include a thrust bearing 155 configured to absorb an axial load of the shaft 100. The durability of the thrust bearing 155 may be reduced substantially due to the reaction force generated by the flow of the exhaust gas.

As illustrated in FIG. 3, according to the present invention, when the oil or air is introduced into the hollow aperture 102, the inlet aperture 104 is obliquely machined to allow the oil or air to be introduced into the turbine wheel 110 while moving in the side direction of the turbine wheel 110, thereby offsetting the reaction force generated in the shaft 100 by the exhaust gas. Therefore, the durability of the thrust bearing 155 may be secured.

Further, the injection passage 128 may extend while being inclined at the same angle as the inlet aperture 104. In other words, as illustrated in FIG. 3, the injection passage 128 and the inlet aperture 104 may be disposed on a linear line with each other, to allow the oil or air discharged through the injection passage 128 to be introduced more smoothly into the inlet aperture 104. Furthermore, the oil or air discharged through the injection passage 128 may offset the reaction force transmitted from the exhaust gas to the shaft 100. Meanwhile, the inlet aperture 104 may be inclined to position an inlet formed on the outer circumferential surface of the shaft 100 at a point spaced by a set distance in a circumferential direction from an outlet formed on the inner circumferential surface of the shaft 100.

Figure 4:
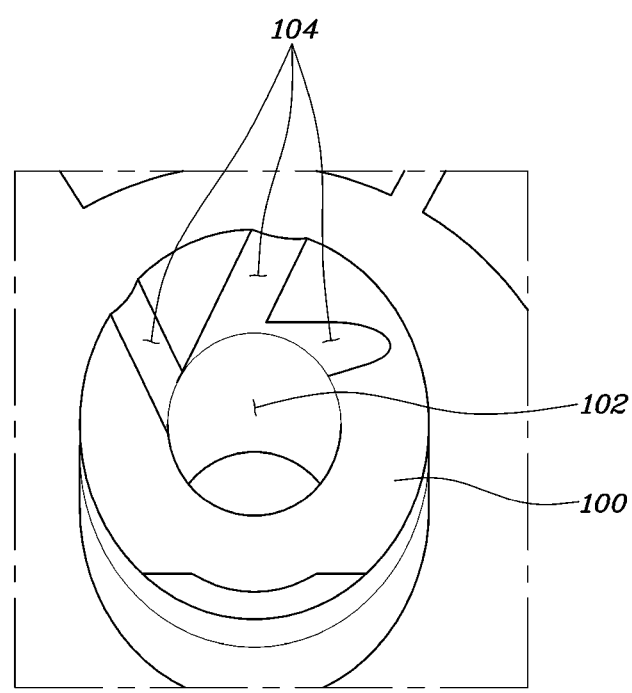
FIG. 4 is a cross-sectional view taken along line A-A of FIG. 2 according to an exemplary embodiment of the present invention.

FIG. 4 is a cross-sectional view taken along line A-A of FIG. 2. Referring to FIGS. 2 and 4, the inlet aperture 104 may be inclined with respect to the radial direction of the shaft 100, and may also be machined to be inclined with respect to the circumferential direction of the shaft 100. In other words, the inlet aperture 104 may be formed to allow the oil or air to be introduced toward the eccentric point from a center of the shaft 100 when being introduced into the hollow aperture 102 to transmit a torque to the shaft 100.

For example, when the inlet aperture 104 is machined vertically along the radial direction of the shaft 100, when the oil is introduced into the hollow aperture 102, the torque of the shaft 100 may be reduced by the viscosity of the oil. Therefore, the inlet aperture 104 may be machined to extend in the eccentric direction with respect to the shaft 100 to assist the torque while preventing the torque loss of the shaft 100 from occurring when the oil is supplied to the shaft 100, to thus increase the turbocharger efficiency. On the other hand, the outlet aperture 106 may extend along the radial direction of the shaft 100. In addition, the drain passage 130 may be formed in the center housing 120 to discharge the oil in the shaft groove 122 at a point facing the outlet aperture 106 to the outside.

Figure 5:
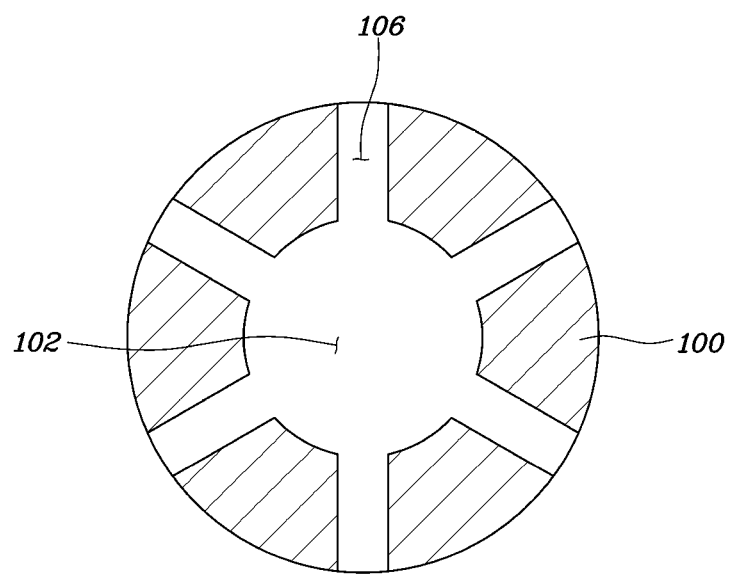
FIG. 5 is a cross-sectional view taken along line B-B of FIG. 2 according to an exemplary embodiment of the present invention.
Figure 6:
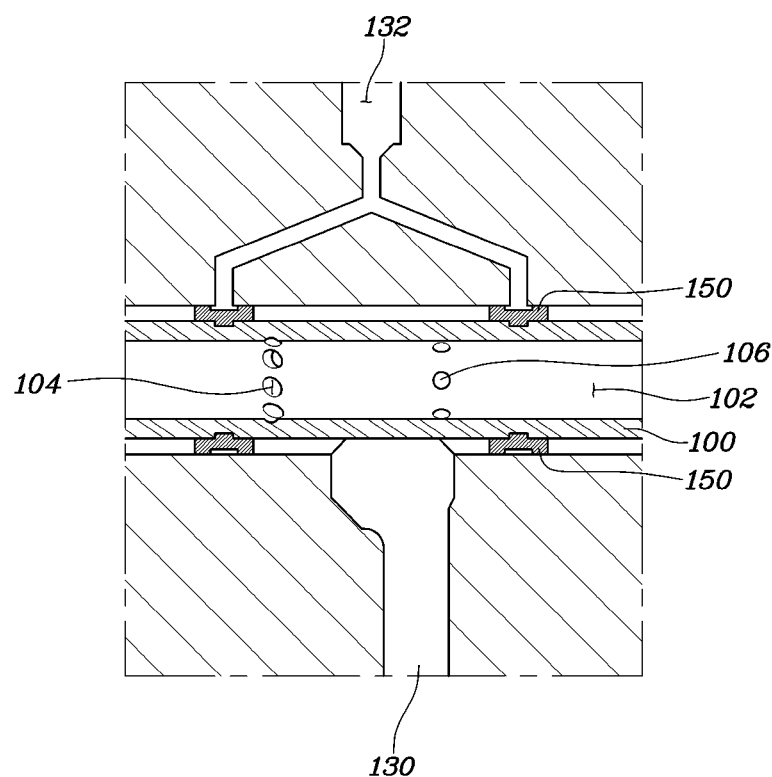
FIG. 6 is a cross-sectional view showing a drain passage and a lubricating passage according to an exemplary embodiment of the present invention.

FIG. 5 is a cross-sectional view taken along line B-B of FIG. 2 and FIG. 6 is a cross-sectional view showing a drain passage and a lubricating passage according to an exemplary embodiment of the present invention. Referring to FIGS. 2, 5 and 6, the outlet aperture 106 may be configured to discharge the oil inside the hollow aperture 102 and the hollow groove 122 to the outside more smoothly. The outlet aperture 106 may be formed vertically along the radial direction of the shaft 100, to induce the oil to be smoothly discharged by a centrifugal force. The oil discharged into the shaft groove 122 through the outlet aperture 106 may be discharged to the outside through the drain passage 130, to circulate the oil in the turbocharger.

Referring to FIGS. 1, 3 and 6, the turbocharger for a vehicle according to the present invention may further include a plurality of bearings 150 installed between the shaft 100 and the shaft groove 122 to allow the shaft 100 to rotate relatively with respect to the shaft groove 122, in which the plurality of bearings 150 are installed at positions spaced apart from each other to be disposed between the inlet aperture 104 and the outlet aperture 106. In other words, the shaft 100 may be installed rotatably in the center housing 120 through the plurality of bearings 150. In particular, the inlet aperture 104 and the outlet aperture 106 may be formed in the space between the plurality of bearings 150, to prevent the oil, that is not to be introduced into the inlet aperture 104 but flow into the shaft groove 122, from exiting into another space of the shaft groove 122 by the bearings 150. Therefore, the bearing 150 is capable of sealing the oil.

Figure 7:
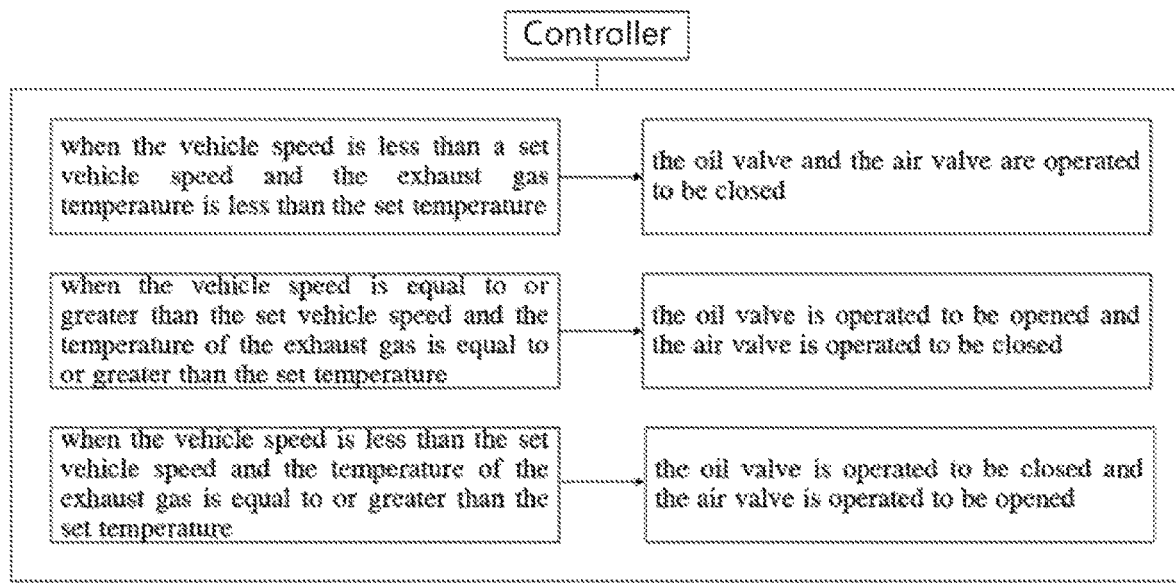
FIG. 7 is a flowchart showing the operation of an oil valve and an air valve according to an exemplary embodiment of the present invention.

Furthermore, as shown in FIG. 7, the vehicle turbocharger according to the present invention may include a controller 160 configured to operate both the oil valve 140 and the air valve 145 to be closed when the vehicle speed is less than the set vehicle speed and the exhaust gas temperature is less than the set temperature, the oil valve 140 to be opened and the air valve 145 to be closed when the vehicle speed is equal to or greater than the set vehicle speed and the temperature of the exhaust gas is equal to or greater than the set temperature, and the oil valve 140 to be closed and the air valve 145 to be opened when the vehicle speed is less than the set vehicle speed and the temperature of the exhaust gas is equal to or greater than the set temperature.

The controller 160 may be an electronic control unit (ECU) of the vehicle, and may be configured to receive data regarding the vehicle speed and the temperature of the exhaust gas from a vehicle speed sensor and a temperature sensor, compare the preset vehicle speed with the vehicle speed data and the preset temperature with the exhaust gas temperature data to electronically operate the oil valve 140 and the air valve 145 connected to each other via the communication line. For example, when the vehicle stops or is traveling at a low speed is while the exhaust gas temperature is low or the vehicle is traveling at a low speed, both of the oil valve 140 and the air valve 145 may be closed to operate the same as the conventional turbocharger, thereby preventing the oil from being introduced into the shaft groove 122.

Further, when the temperature of the exhaust gas increases and the vehicle is traveling at a high speed, the oil valve 140 may be opened to supply the oil into the turbine wheel 110, thereby inducing the turbine wheel 110 to be cooled. The air valve 145 may be shut off to prevent the oil in the turbine wheel 110 from being unnecessarily discharged to the outside due to the air supply. When the temperature of the exhaust gas is high but the vehicle is in a deceleration state in which it is traveling at a low speed, the air valve 145 may be opened to supply air while the oil valve 140 is closed to discharge the heat-exchanged oil remaining in the inside the turbine wheel 110 and the shaft 100 to the outside. Accordingly, it may be possible to induce the turbine wheel 110 to be cooled by new oil.

According to the turbocharger for a vehicle having the above structure, since the hollow groove may be formed in the turbine wheel, the weight of the turbine wheel may be reduced to reduce the inertia of the turbine wheel, thereby improving the startability and the low speed torque performance of the vehicle. Further, since oil may be circulated through the turbocharger shaft and the inside of the turbine wheel to perform the cooling, the turbocharger may use the relatively inexpensive material having the low mechanical performance, thereby reducing the cost of the turbocharger. Further, since the inlet aperture of the shaft is machined to be inclined, the reaction force generated by the exhaust gas may be offset to secure the durability of the thrust bearing.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A turbocharger for a vehicle, comprising:
    a shaft having a hollow aperture disposed inside thereof, wherein an outer circumferential surface of the shaft includes an inlet aperture and an outlet aperture which communicate with the hollow aperture;
    a turbine wheel integrally installed at one end of the shaft, wherein a hollow groove formed in the turbine wheel communicates with the hollow aperture of the shaft;
    a center housing having a shaft groove disposed therein, wherein the shaft is rotatably installed in the shaft grove and with the center housing includes an oil passage to which oil is supplied from an oil pipe, an air passage to which air is supplied from an air tank, and an injection passage that extends to the shaft groove while being connected to the oil passage and the air passage; and
    an oil valve and an air valve installed in the oil passage and the air passage, respectively, to selectively open and close a flow of a fluid.

2. The turbocharger of claim 1, wherein the inlet aperture is formed at a point facing a direction in which the injection passage extends.

3. The turbocharger of claim 2, wherein the inlet aperture is inclined to approach the turbine aperture toward a radial inside of the shaft.

4. The turbocharger of claim 3, wherein the injection passage extends to be inclined at the same angle as the inlet aperture.

5. The turbocharger of claim 3, wherein the inlet aperture is inclined to position an inlet formed on an outer circumferential surface of the shaft at a point spaced by a set distance in a circumferential direction from an outlet formed on an inner circumferential surface of the shaft.

6. The turbocharger of claim 1, wherein the outlet aperture extends along a radial direction of the shaft.

7. The turbocharger of claim 6, wherein an inside of the center housing includes a drain passage to discharge oil in the shaft groove at a point facing the outlet aperture to an outside.

8. The turbocharger of claim 1, further comprising:
    a plurality of bearings installed between the shaft and the shaft groove to allow the shaft to rotate relatively with respect to the shaft groove,
    wherein the plurality of bearings are installed at positions spaced apart from each other to be disposed between the inlet aperture and the outlet aperture.

9. The turbocharger of claim 1, further comprising:
    a controller configured to operate both the oil valve and the air valve to be closed when vehicle speed is less than a set vehicle speed and an exhaust gas temperature is less than a set temperature, the oil valve to be opened and the air valve to be closed when the vehicle speed is equal to or greater than the set vehicle speed and the temperature of the exhaust gas is equal to or greater than the set temperature, and the oil valve to be closed and the air valve to be opened when the vehicle speed is less than the set vehicle speed and the temperature of the exhaust gas is equal to or greater than the set temperature.

* * * * *